Dec. 24, 1957 K. MEISSNER 2,817,325
CONTROL DEVICE FOR INTERNAL COMBUSTION ENGINES
Filed July 3, 1956 2 Sheets-Sheet 2

INVENTOR:
Kurt Meissner
BY:
Michael S. Striker
Agt

United States Patent Office 2,817,325
Patented Dec. 24, 1957

2,817,325
CONTROL DEVICE FOR INTERNAL COMBUSTION ENGINES

Kurt Meissner, Stuttgart, Germany, assignor to Robert Bosch G. m. b. H., Stuttgart, Germany Application July 3, 1956, Serial No. 595,793

Claims priority, application Germany July 12, 1955

11 Claims. (Cl. 123—140)

The present invention relates to internal combustion engines and more particularly to that type of internal combustion engine which includes a fuel injection pump for injecting fuel into the cylinders and which also includes an igniting means for igniting the combustible charges in the cylinders during normal operation of the engine.

With engines of this type, and particularly engines of this type of relatively high output and after such engines have been operating at considerable load, it often happens that the engine continues to operate after the ignition is turned off because the fuel air mixture used for idling continues to flow to the cylinders and the mixture is ignited in the cylinders even after the ignition is turned off because the hot igniting elements such as spark plugs or the like continue to glow and are still capable of igniting the mixture even after the ignition is turned off, so that with these engines the operation often does not terminate at the desired moment when the ignition is turned off.

One of the objects of the present invention is to provide an engine of the above type with a structure which guarantees that the engine will stop operating when the ignition is turned off.

Another object of the present invention is to provide an engine of the above type which will stop operating when the ignition is turned off and which does not require any special adjustment of the elements which control the idling operation of the engine in order to accomplish this result.

A further object of the present invention is to provide a structure capable of accomplishing the above objects and at the same time composed of simple and ruggedly constructed elements which are very reliable in operation.

With the above objects in view the present invention mainly consists of an internal combustion engine which includes an igniting means for igniting a combustible charge during normal operation of the engine, this engine further including an intake manifold and a valve in the latter for controlling the flow of air through the intake manifold. A means communicates with the intake manifold downstream of the valve therein for supplying fuel in direct proportion to the pressure in the manifold downstream of the valve therein. This valve cooperates with the manifold and also, if desired, with suitable additional structure to provide a flow of air from the upstream to the downstream side of the valve sufficient for idling purposes when the valve is in an idling position. In accordance with the present invention, a means is provided for automatically cutting off the flow of air to the downstream side of the valve when the ignition of the engine is turned off, so that there is a very sharp drop in pressure in the intake manifold downstream of the valve therein, and as a result the control means which controls the fuel supply is acted on by the great drop in pressure to cut off the supply of fuel and in this way the engine is reliably stopped whenever the ignition is turned off.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary, side elevational, partly sectional, and partly diagrammatic illustration of one embodiment of a structure according to the present invention;

Fig. 2 is a fragmentary, partly diagrammatic, sectional, side elevational view of another embodiment of the present invention, the structure of Fig. 2 cooperating with the injection pump structure shown at the left of Fig. 1;

Figure 3:
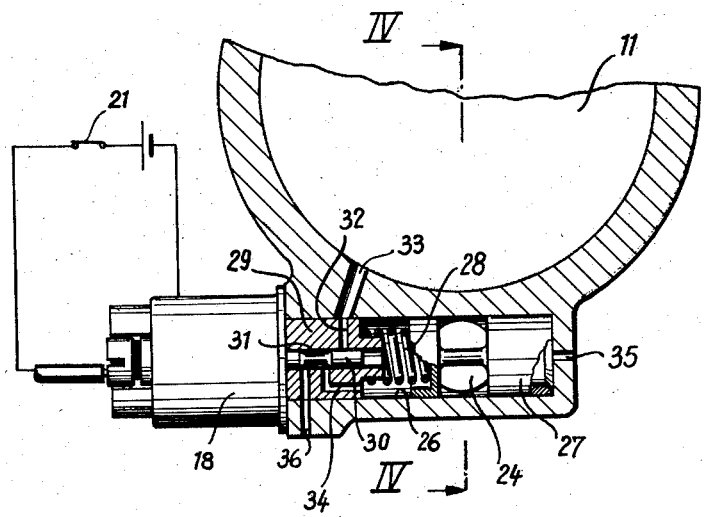
Fig. 3 is a fragmentary transverse sectional view of a third embodiment of the present invention, the structure of Fig. 3 also cooperating with the injection pump of Fig. 1.

The three embodiments of the invention which are illustrated in the drawings each cooperate with the injection pump shown fragmentarily at the left of Fig. 1. This injection pump includes a housing 1 which supports a cam shaft 2 for rotation about its axis. This cam shaft 2 is driven in a known way by an unillustrated engine which has an igniting means for igniting the combustible charge thereof during normal operation of the engine. The rotating cam shaft 2 acts on the pump piston 3 to reciprocate the latter for supplying fuel in a known way, and the piston 3 includes an annular gear portion which cooperates with a rack 4 guided for axial movement back and forth. This rack 4 controls the angular position of the piston 3, and the latter is provided with a helical groove which in a known way supplies more or less fuel depending upon the angular position of the piston 3 which is determined by the position of the rack 4. This rack 4 is connected at its right end, as viewed in Fig. 1, to a diaphragm 6 which is urged by the spring 5 to the left, as viewed in Fig. 1, and which divides an extension of the housing 1 into a pair of chambers 7 and 8. The chamber 8 communicates through an opening 9 with the outer atmosphere, while the chamber 7 communicates through a conduit 10 with a bore 12 formed in the intake manifold 11a of the engine just downstream of the valve 13a which controls the flow of air through the intake manifold 11a in a known way. Thus, depending upon the pressure prevailing in the intake manifold 11a downstream of the valve 13a, there will be at certain times a differential pressure acting upon the diaphragm 6 to shift the rack 4 and adjust the angular position of the piston 3 so as to control the fuel supply. The arrangement is such that the supply of fuel varies in direct proportion to the pressure in the intake manifold 11a downstream of the valve 13a. The expression "direct proportion" used in this specification and in the claims which follow does not necessarily mean a straight line relationship between the pressure in the manifold and the fuel supply. This expression is intended only to mean that as the pressure in the intake manifold downstream of the valve 13a increases the supply of fuel increases and as the pressure downstream of the valve 13a decreases the supply of fuel also decreases. The throttle valve 13a is controlled by a lever means which includes a lever 14, a connecting rod 15, and a lever 16 capable of being actuated by the operator so that the position of the throttle valve 13a can be regulated at the will of the operator during normal operation of the engine. A spring 17 engages the lever 16 to urge the lever means to place the valve 13a in the position thereof illustrated in Fig.

noid 18c is energized the slide valve 30 is located in the position shown in Fig. 3, while when the armature 18c is unenergized an unillustrated spring retracts the slide valve 30 to the right, as viewed in Fig. 3, to a rest position thereof.

A passage 32 is formed in the block 29 and provides communication between the axial bore 31 thereof and a passage 33 formed in the intake manifold 11c downstream of the throttle valve 13c. Also, the block 29 is formed with a passage 34 providing communication between the axial bore 31 and the space within the bore 26' where the spring 28' is located. The intake manifold is also formed with a passage 35 located at the right end of the bore 26', as viewed in Fig. 3, so that the right end of the valve 27' always communicates with the outer atmosphere through the passage 35. Also, the block 29 as well as the intake manifold are formed with a passage 36 providing communication between the axial bore 31 of the block 29 and the outer atmosphere.

Figure 4:
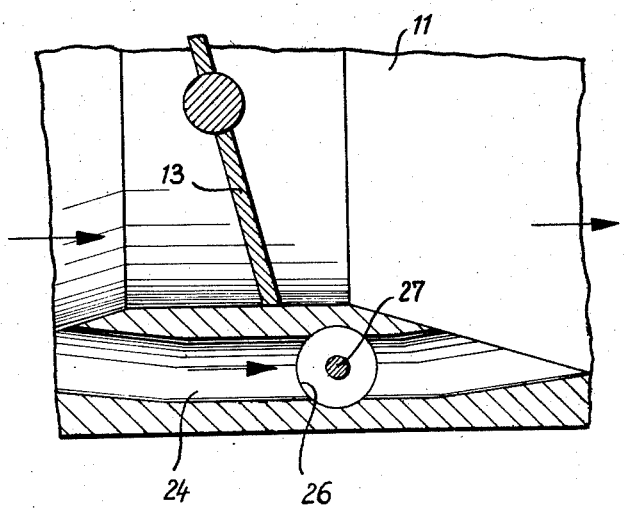
Fig. 4 is a sectional elevational view taken along line IV—IV of Fig. 3 in the direction of the arrows.

With the embodiment of Figs. 3 and 4, the switch 21 is closed as with the above described embodiments to energize the solenoid 18c whenever the ignition is turned on, and the switch 21 is opened whenever the ignition is turned off in order to deenergize the solenoid 18c.

The above described structure of Figs. 3 and 4 operates as follows:

When the engine is running the parts have the position shown in Figs. 3 and 4. In this position the passage 33 which communicates with the downstream side of the valve 13c is prevented by the slide valve 30 from communicating with the space within the bore 26' where the spring 28' is located. However, at this time the reduced cross section of the slide valve 30 provides communication between the passages 36 and 34 so that the space within the bore 26' where the spring 28' is located communicates through the passages 34 and 36 with the outer atmosphere. Since the right end of the valve member 27' communicates with the outer atmosphere through the passage 35, the spring 28' locates the valve 27' in the open position thereof shown in Figs. 3 and 4 where the flow of air through the bypass 24' is substantially unobstructed.

Assuming now that the operator wishes to stop the engine and turns off the ignition, the solenoid 18c is immediately unenergized, and the unillustrated spring retracts the slide valve 30 to a position where it cuts off communication between the passage 34 and the outer atmosphere and provides communication between the passage 33 and the interior portion of the bore 26', where the spring 28' is located. Thus, when the ignition is turned off the left end of the valve 27', as viewed in Fig. 3, is immediately placed in communication with the zone of reduced pressure located at the downstream side of the throttle valve 13c. Because the right end of the slide valve 27' communicates through the passage 35 with the outer atmosphere, there is a differential pressure acting on the valve 27' which automatically shifts the latter to the left, as viewed in Fig. 3, until the portion of the valve 27' located to the right of its intermediate portion of reduced cross section completely closes the bypass 24', the left end of the valve 27' engaging the right end of the block 29 at this time. In this way whenever the ignition is turned off the flow of air to the downstream side of the valve 13c also is completely cut off in an automatic manner, and as a result the pressure at the downstream side of the valve 13c drops off sharply to cut off the flow of fuel in the manner described above so as to stop the operation of the engine practically simultaneously with the turning off of the ignition.

It will be noted that with the embodiment of Figs. 3 and 4 the movement of the valve 27' to its closing position depends upon the operation of the engine at the instant when the ignition is turned off. After the engine stops, air gradually leaks past the throttle valve 13c to provide equal pressures on both sides of this valve and to allow the spring 28' to automatically return the valve 27' to the position thereof shown in Fig. 3.

Thus, it will be noted that with the embodiment of Figs. 3 and 4 advantage is taken of the reduction in pressure at the downstream side of the valve 13c during idling of the engine in order to completely cut off the flow of air to the downstream side of the valve 13c when the ignition is turned off. In contrast, with the embodiments of Figs. 1 and 2 a solenoid is required to cut off the flow of air. As a result of the use of the differential pressure acting on valve 27' with the embodiment of Figs. 3 and 4, it is possible to use a solenoid 18c with the embodiment of Figs. 3 and 4 which is much smaller than the solenoids used in the embodiments of Figs. 1 and 2 and which requires far less energy. With the embodiment of Figs. 3 and 4, the bypass 24' is blocked only during the extremely short period of time when the engine continues to operate after the ignition is turned off. When the ignition is turned off and the engine is not operating the bypass 24' of Figs. 3 and 4 is open. In contrast, with the embodiments of Figs. 1 and 2 the bypass of Fig. 2 as well as the flow of air past the valve 13a of Fig. 1 are completely cut off not only after ignition while the engine is still running for a short period of time but also while the engine is standing still and the ignition is turned off.

The embodiment of Fig. 2 as well as the embodiment of Figs. 3 and 4 are provided with an ignition arrangement as described above and shown in Fig. 1.

It will be understood that each of the elements described above, or two or more together, may also find a useful application in other types of internal combustion engines differing from the types described above.

While the invention has been illustrated and described as embodied in internal combustion engines having an igniting means for igniting a combustible charge during normal operation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

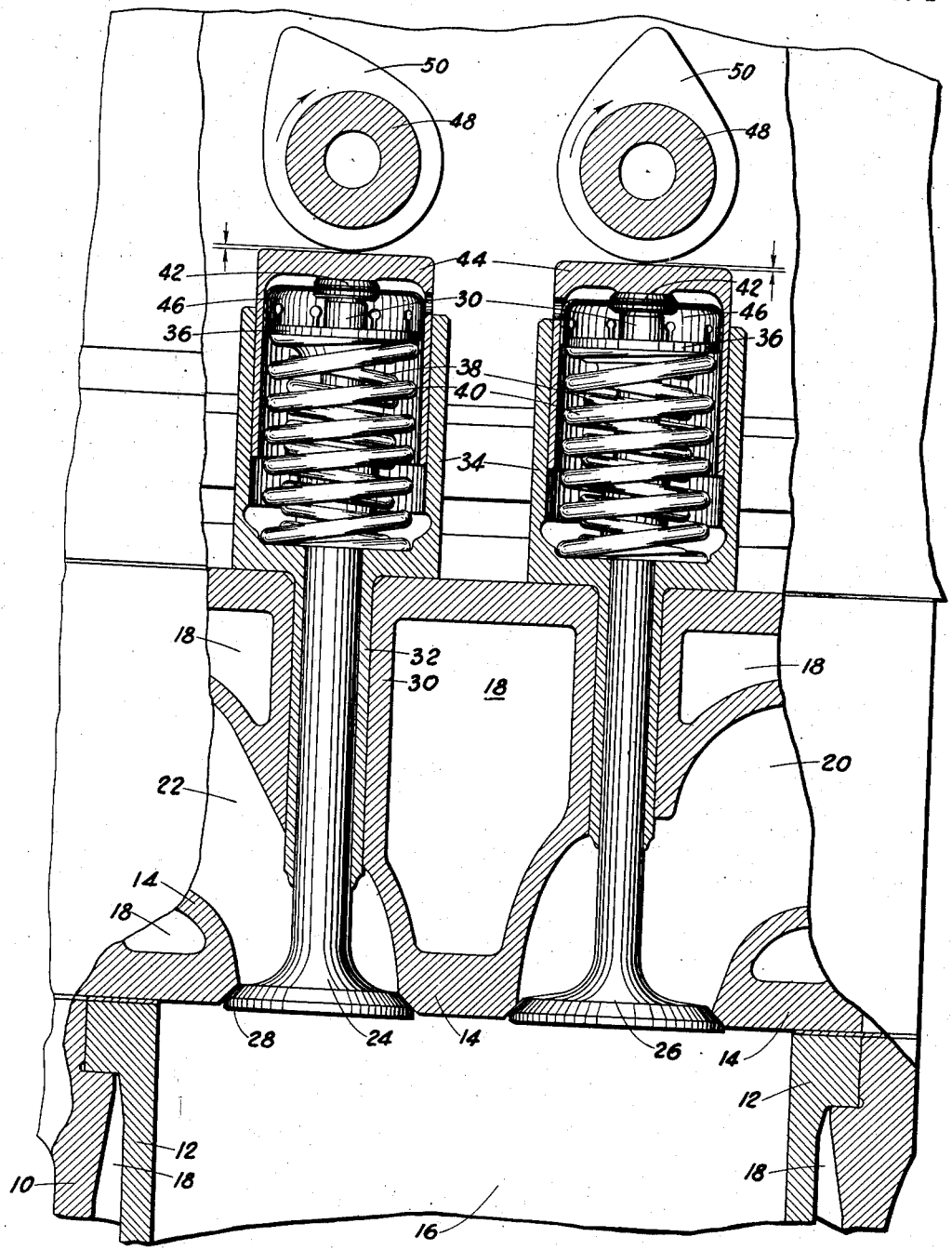

What is claimed as new and desired to be secured by Letters Patent is:

1. In an internal combustion engine having an igniting means for igniting a combustible charge during normal operation of the engine, in combination, an intake manifold; valve means in said manifold for controlling the flow of air therethrough, said valve means having an idling position providing a flow of air from the upstream to the downstream side of said valve means sufficient for idling of the engine; control means communicating with said intake manifold downstream of said valve means for controlling the supply of fuel in accordance with the pressure in said manifold downstream of said valve means; and means for cutting off the supply of air to the downstream side of said valve means when the ignition of the engine is turned off.

2. In an internal combustion engine having an igniting means for igniting a combustible charge during normal operation of the engine, in combination, an intake manifold; valve means in said manifold for controlling the flow of air therethrough, said valve means having an idling position providing a flow of air from the upstream to the downstream side of said valve means sufficient for idling of the engine; control means communicating with said manifold downstream of said valve means for controlling the supply of fuel in direct proportion to the pressure in said manifold downstream of said valve means;

and means for cutting off the supply of air downstream of said valve means when the igniting means of the engine is turned off to reduce the pressure in the manifold downstream of said valve means suddenly and to cut off the supply of fuel when the igniting means is turned off as a result of the reduction in pressure downstream of said valve means.

3. In an internal combustion engine having an igniting means for igniting a combustible charge during normal operation of the engine, in combination, an intake manifold; valve means in said manifold for controlling the flow of air therethrough, said valve means having an idling position providing a passage for flow of air from the upstream to the downstream side of said valve means sufficient for idling of the engine; control means communicating with said manifold downstream of said valve means for controlling the supply of fuel in direct proportion to the pressure in said manifold downstream of said valve means; and means actuating said valve means for cutting off the supply of air downstream of said valve means when the igniting means of the engine is turned off to reduce the pressure in the manifold downstream of said valve means suddenly and to cut off the supply of fuel when the igniting means is turned off as a result of the reduction in pressure downstream of said valve means, said valve means closing said passage for the flow of air to the downstream side of said valve means when the ignition is turned off and only while the engine continues to operate.

4. In an internal combustion engine having an igniting means for igniting a combustible charge during normal operation of the engine, in combination, an intake manifold; a valve in said manifold for controlling the flow of air therethrough, said valve having an idling position where the intake manifold is not fully closed by said valve to provide a flow of air from the upstream to the downstream side of said valve sufficient for idling purposes; control means communicating with said intake manifold downstream of said valve for supplying fuel to the engine in direct proportion to the pressure in the intake manifold downstream of said valve; stop means determining the position of said valve for idling purposes; and means for shifting said stop means to a position providing complete closure of said intake manifold by said valve when the igniting means is turned off to cut off the supply of air downstream of said valve and thereby cut off the supply of fuel.

5. In an internal combustion engine having an igniting means for igniting a combustible charge during normal operation of the engine, in combination, an intake manifold; a valve movable in said manifold for controlling the flow of air therethrough; lever means capable of being actuated by the operator for determining the position of said valve during operation of the engine; spring means acting on said lever means for urging said valve to a position where it fully closes said intake manifold; stop means engaging said lever means to prevent the same from moving said valve to the fully closed position thereof when said lever means is released to said spring means and for locating said valve in a position providing a flow of air from the upstream to the downstream side of said valve sufficient for idling purposes; means communicating with said manifold downstream of said valve for controlling the supply of fuel in direct proportion to the pressure in said manifold downstream of said valve; and means for shifting said stop means to a position freeing said spring means to actuate said lever means to move said valve to said position fully closing said manifold when the igniting means of the engine is turned off so that the great drop in pressure downstream of said valve causes said control means to cut off the supply of fuel.

6. In an internal combustion engine having an igniting means for igniting a combustible charge during normal operation of the engine, in combination, an intake manifold; a valve movable in said manifold for controlling the flow of air therethrough; lever means capable of being actuated by the operator for determining the position of said valve during operation of the engine; spring means acting on said lever means for urging said valve to a position where it fully closes said intake manifold; stop means engaging said lever means to prevent the same from moving said valve to the fully closed position thereof when said lever means is released to said spring means and for locating said valve in a position providing a flow of air from the upstream to the downstream side of said valve sufficient for idling purposes; means communicating with said manifold downstream of said valve for controlling the supply of fuel in direct proportion to the pressure in said manifold downstream of said valve; and means for shifting said stop means to a position freeing said spring means to actuate said lever means to move said valve to said position fully closing said manifold when the igniting means of the engine is turned off so that the great drop in pressure downstream of said valve causes said control means to cut off the supply of fuel, said stop means being in the form of an armature of a solenoid and said means for shifting said stop means being in the form of the coil of the solenoid which is energized simultaneously with the turning on of the igniting means to locate said armature in a position determining the idling position of said valve and which when unenergized upon turning off of the igniting means frees said armature for movement to a position allowing said spring means to locate said valve in the fully closed position thereof.

7. In an internal combustion engine having an igniting means for igniting a combustible charge during normal operation of the engine, in combination, an intake manifold; a valve in said intake manifold for controlling the flow of air therethrough, said valve having a position completely closing said manifold during idling of the engine; bypass means bypassing said valve for providing a flow of air from the upstream to the downstream side of said valve when the latter is in its idling position sufficient for idling purposes; control means communicating with said manifold downstream of said valve for supplying fuel in direct proportion to the pressure in the manifold downstream of said valve; a second valve movable to and from a closing position extending across and closing said bypass means to cut off the supply of air to the downstream side of said first valve; and means for locating said second valve in said closing position thereof when the igniting means is turned off so as to cut off the supply of fuel due to the great reduction in pressure in the manifold downstream of said first valve therein, said means for locating said second valve in said closing position thereof when the igniting means is turned off locating said second valve out of the closing position thereof when the igniting means is turned on to open the bypass means during normal operation of the engine.

8. In an internal combustion engine having an igniting means for igniting a combustible charge during normal operation of the engine, in combination, an intake manifold; a valve in said intake manifold for controlling the flow of air therethrough, said valve having a position completely closing said manifold during idling of the engine; bypass means bypassing said valve for providing a flow of air from the upstream to the downstream side of said valve when the latter is in its idling position sufficient for idling purposes; control means communicating with said manifold downstream of said valve for supplying fuel in direct proportion to the pressure in the manifold downstream of said valve; a second valve movable to and from a closing position extending across and closing said bypass means to cut off the supply of air to the downstream side of said first valve; and means for locating said second valve in said closing position thereof when the igniting means is turned off so as to cut off the supply of fuel due to the great reduction in pressure in the manifold downstream of said first valve therein, said means for locating said second valve in said closing position thereof when the igniting means is turned off locating said second valve out of the closing position thereof when the igniting means is turned on to open the bypass means during normal operation of the engine, said second valve being in the form of an armature of a solenoid which is spring loaded to move to its closing position when the solenoid is unenergized and said means for moving said second valve being in the form of the coil of the solenoid and an electrical circuit for energizing the coil when the igniting means is energized and for deenergizing the coil when the igniting means is unenergized.

9. In an internal combustion engine having an igniting means for igniting a combustible charge during normal operation of the engine, in combination, an intake manifold; a first valve in said manifold for controlling the flow of air therethrough, said first valve having an idling position where it completely closes said manifold; bypass means bypassing said first valve to provide a flow of air from the upstream to the downstream side of said first valve sufficient for idling purposes; control means communicating with said manifold downstream of said first valve for supplying fuel in direct proportion to the pressure in said manifold downstream of said first valve; a second valve carried by said manifold for movement between an open position leaving said bypass means open and a closed position closing said bypass means; and means responsive to the turning off of the igniting means of the engine for acting on said second valve with the difference in pressure between the outside atmosphere and the air in said manifold downstream of said first valve when the latter is in the idling position thereof to move said second valve from said open to said closed position thereof while the engine continues to operate, the pressure drop in said manifold downstream of said first valve when said second valve is in said closed position thereof cutting off the supply of fuel.

10. In an internal combustion engine having an igniting means for igniting a combustible charge during normal operation of the engine, in combination, an intake manifold; a first valve in said manifold for controlling the flow of air therethrough, said first valve having an idling position where it completely closes said manifold; bypass means bypassing said first valve to provide a flow of air from the upstream to the downstream side of said first valve sufficient for idling purposes; control means communicating with said manifold downstream of said first valve for supplying fuel in direct proportion to the pressure in said manifold downstream of said first valve; a second valve carried by said manifold for movement between an open position leaving said bypass means open and a closed position closing said bypass means; and means responsive to the turning off of the igniting means of the engine for acting on said second valve with the difference in pressure between the outside atmosphere and the air in said manifold downstream of said first valve when the latter is in the idling position thereof to move said second valve from said open to said closed position thereof while the engine continues to operate, the pressure drop in said manifold downstream of said first valve when said second valve is in said closed position thereof cutting off the supply of fuel, said means responsive to turning off of the igniting means being in the form of a solenoid which is energized when the igniting means is turned on and unenergized when the igniting means is turned off.

11. In an internal combustion engine having an igniting means for igniting a combustible charge during normal operation of the engine, in combination, a first valve; an intake manifold housing said first valve to have the flow of air therethrough controlled by said first valve, the latter having an idling position closing said intake manifold, and said intake manifold being formed with a bypass bypassing said first valve to provide a flow of air from the upstream to the downstream side of said first valve sufficient for idling purposes, and said intake manifold being formed with a bore extending across said bypass, said intake manifold also being formed with a passage at one end of said bore providing communication between the interior of the latter and the outer atmosphere and with a second passage providing communication between the interior of said intake manifold downstream of said first valve and an opposite end portion of said bore; a second valve slidable in said bore between an open position providing a free air passage through said bypass and a closed position blocking said bypass, said second valve having one end directed toward said first-mentioned passage and communicating through the latter with the outer atmosphere and having an opposite end in said bore directed toward said second passage; spring means in said bore engaging said opposite end of said second valve for urging the latter toward said first-mentioned passage; a third valve located at said opposite end of said bore and having a first position cutting off communication between said bore and second passage and providing communication between said bore and the outer atmosphere and a second position cutting off communication between said bore and the outer atmosphere and providing communication between said bore and second passage, so that when said third valve is in said second position thereof the pressure in said manifold downstream of said first valve when the latter is in said idling position acts on said opposite end of said second valve to provide a differential pressure causing the outer atmosphere to shift said second valve from said open to said closed position thereof against the influence of said spring; and means acting on said third valve for placing the latter in said first position thereof when the igniting means of the engine is turned off and for placing said third valve in said second position thereof when the igniting means is turned off, so that when the igniting means is turned off the drop in pressure downstream of said first valve acts to move said second valve to close said bypass; and means communicating with said manifold downstream of said first valve for supplying fuel to the engine in direct proportion to the pressure downstream of said first valve, so that when said first valve is in said idling position thereof and said igniting means is turned off the great drop in pressure downstream of said first valve due to the interruption of the flow of air to the downstream side of said first valve will cause the supply of fuel to be stopped in order to stop the operation of the engine when the igniting means is turned off.

No references cited.